United States Patent Office 2,883,381
Patented Apr. 21, 1959

2,883,381
NEW PROCESS FOR THE PRODUCTION OF HYDROHALIDES OF AMINO-ALKYLATED BARBITURIC ACIDS

Ludwig Schusteritz, Moorrege, Germany, assignor to Nordmark-Werke Gesellschaft mit beschrankter Haftung, Hamburg, Germany No Drawing. Application August 16, 1957
Serial No. 678,518

Claims priority, application Germany February 15, 1956

5 Claims. (Cl. 260—247.5)

This invention relates to a new process for the production of hydrohalides of amino-alkylated barbituric acids and is a continuation-in-part application of my copending application Serial No. 625,623, filed December 3, 1956, now abandoned.

The said hydrohalides of amino-alkylated barbituric acids are known per se but are obtainable by the known processes only with bad yields. The said hydrohalides of the amino-alkylated barbituric acids may be represented by the general Formula I

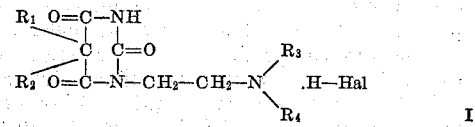

in which $R_1$ is an alkyl radical containing 1–3 carbon atoms, $R_2$ is a phenyl-group, $R_3$ and $R_4$ represent alkyl radicals containing 1–3 carbon atoms which may form jointly and in conjunction with the adjacent nitrogen atom a ring system of the group consisting of the piperidine, the pyrrolidine and the morpholine ring systems and Hal is a halogen atom.

It have found that the hydrohalides of the amino-alkylated barbituric acids of the aforementioned general formula I are obtainable in a technically advantageous manner by reacting in the presence of a solvent the barbituric acids of the general Formula II

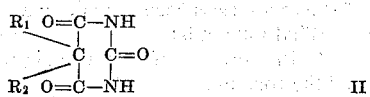

in which $R_1$ and $R_2$ have the same meaning as in Formula I, with the N-substituted aminoethyl halides of the general Formula III

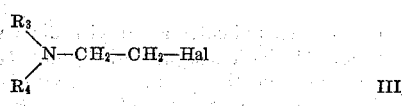

in which $R_3$ and $R_4$ have the same meaning as in Formula I and Hal is a halogen atom.

The reaction proceeds with the formation of the amino-alkylated barbituric acid and of the hydrogen halide in question, the latter combining at once with the amino-alkylated barbituric acid to form the hydrohalide of the amino-alkylated barbituric acid.

Suitable starting materials of the general Formula II are for example the barbituric acids of the general formula II, in which $R_1$ stands for a methyl-, ethyl-, propyl- or allyl-radical.

As solvents one may use ketones such as acetone, butanone or mesityloxide, esters such as ethylacetate or butylacetate and alcohols such as ethanol, isopropanol, a butanol or an amyl-alcohol.

According to one embodiment of the process of the invention the barbituric acid in question is dissolved in one of the solvents mentioned before, a substantially stoichiometric amount of the aminoethyl halide compound is added and the mixture thus obtained is stirred for a short time while heating it to a temperature between about 40 to 90° C. The reaction begins in general after a few minutes and proceeds with moderate evolution of heat. In some cases it may be advisable to continue the stirring for a somewhat longer time such as about 30 minutes. After the reaction is finished the hydrohalide of the amino-alkylated barbituric acid formed by the reaction crystallises out in a fairly pure state and in a high yield.

The reaction product may be recrystallized from a suitable solvent, preferably ethanol, and obtained thereby in a pure state.

Another embodiment of the process of the invention consists in mixing a suspension of the sodium compound of the barbituric acid used as starting material with a solution of the hydrohalide compound of the aminoethyl halide used as the other starting material in an organic solvent such as acetone, butanone or ethylacetate by stirring at a temperature of about 10–20° C. The barbituric acid component dissolves with negative heat of reaction sodium chloride being formed. The sodium chloride which is formed may be filtered off in the cold. The filtrate which is a clear solution of the free barbituric acid and the aminoethyl halide in the solvent used is thereafter reacted as mentioned before by heating to an elevated temperature between about 40 to 90° C. The hydrohalide of the amino-alkylated barbituric acid begins to form with positive heat of reaction when the reaction temperature is reached.

This embodiment of the process of the invention permits to use the hydrogen halides of the aminoethyl halides as starting materials which is highly advantageous, since the aminoethyl halides in form of the free bases are toxic and unstable. It is however necessary in this case to use the barbituric acid in question in the form of its sodium salt. The two starting materials react with the formation of the free barbituric acid, the free aminoethyl halide and the sodium halogenide in question the process then proceeding according to the first embodiment of the invention.

The process of the second embodiment of the invention may be represented by the following equations:

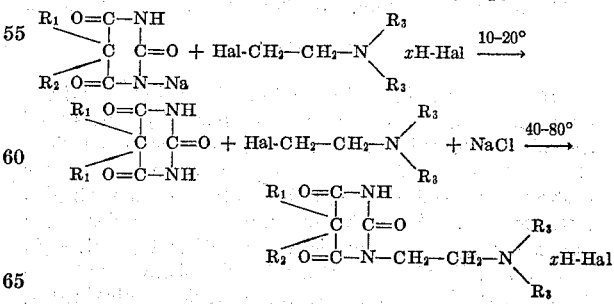

As long as the temperature of the reaction mixture is kept at or below about 20° C. the free barbituric acid and the free aminoethyl halide are formed but do not react with each other. The aminoalkylated barbituric acids are formed when the temperature of the reaction mixture is raised to or above about 40° C.

The sodium halogenide formed in the first step of the process may be filtered off before the second step of the process is carried out, but one may leave the separation of the sodium halogenide until the recrystallisation of the final product is carried out.

The hydrohalides of the amino-alkylated barbituric acids of the general Formula I have already been prepared by Gryszkiewicz-Trochimowski (Arch. Chem. Farm. 2 1-8 (1934)) by heating diethyl aminoethyl chloride for several hours with the sodium compounds of the barbituric acids concerned in alcoholic solution, distilling off the alcohol, mixing the residue with sodium hydroxide solution, submitting the syrup formed to an extraction treatment with ether and introducing hydrogen chloride gas into the previously dried ether solution. It is highly surprising that the reaction proceeds with a high yield amounting to 67-84% by reacting the N-substituted aminoethyl halides not with the sodium compounds of the barbituric acids in question as was proposed by Gryszkiewicz-Trochimowski, but with the free barbituric acids.

The process of the invention is superior to and more economic than the method of production described by Gryszkiewicz-Trochimowski, because it is more simple and shorter and gives better yields. The possibility of being able to produce the products of Formula I by the process of the invention in such an advantageous manner could not be anticipated by the person skilled in the art by following the procedure disclosed by Gryszkiewicz-Trochimowski.

The reaction of the sodium compounds of the barbituric acids with the hydrohalide compounds of aminoethyl halides is particularly suitable for practical use, since this procedure makes it unnecessary to isolate the basic form of the aminoethyl halides which are used and which are generally very toxic and of low stability.

The barbituric acid derivatives which can be produced by the process of the invention have valuable physiological properties. When these derivatives were tested pharmacologically, they showed inter alia good ganglioplegic and hypothermic efficacy and an increased narcotic effect. The compounds can be used as medicines.

Tablets may be obtained for instance as follows: 50 g. of one of the products obtainable in accordance with the examples are mixed with 50 g. of Indian corn starch and 92 g. milk sugar. The mixture thus obtained is intimately ground, moistened with a solution of 2% of gelatine in water, granulated in the usual manner and dried. Then 2 g. of magnesium stearate and 4 g. of talcum are added. The mixture thus obtained is worked up to tablets having a weight of 0.2 g. each corresponding to 50 mg. of effective product per tablet.

Sterilized solutions may be obtained by dissolving one of the products obtainable according to the examples in distilled water to a suitable concentration, filtering the solution, filling it in ampoules and sterilising by heating to about 115° C. for about 30 minutes.

The following examples further illustrate the invention.

*Example 1*

116 parts by weight of phenyl ethyl barbituric acid are dissolved in the hot state in 300 parts by volume of acetone and mixed with 89 parts by weight of piperidinoethyl chloride. After the mixture has been boiled for a short time and then left, crystallisation soon begins after cooling. After the mixture has stood for some hours, the crystal magma is filtered off and dissolved in and recrystallised from ethanol. 5,5-phenyl-ethyl-3-piperidinoethyl barbituric acid hydrochloride is obtained as colourless needles with a melting point of 280° C. Yield: 79.5%.

Instead of the piperidinoethyl chloride one may use for example dimethyl aminoethyl chloride, diethyl aminoethyl bromide, pyrrolidinoethyl chloride and morpholinoethyl chloride.

*Example 2*

254 parts by weight of the sodium salt of phenyl ethyl barbituric acid are suspended at approximately 15 to 20° C. in 500 parts by volume of acetone. 180 parts by weight of diethyl aminoethyl chloride hydrochloride are added over a period of 10 to 15 minutes while stirring and the complete mixture is stirred for another half an hour. The solution, which has now become mobile and clouded by finely dispersed sodium chloride, is filtered and the sodium chloride cake on the filter is washed with 50 parts by volume of acetone.

The clear filtrate is then heated for a short time almost to boiling point and thereafter left to stand without any external heating. Crystallisation commences after a time, and finally the complete reaction mixture solidifies to form a crystal magma. After standing for some hours, the crystals are thoroughly filtered with suction and dissolved in and recrystallised from ethanol. 5,5-phenyl-ethyl-3-diethyl aminoethyl barbituric acid hydrochloride is obtained as colourless needles with a melting point of 251° C. Yield: 83.6%

*Example 3*

24.6 parts by weight of phenyl propyl barbituric acid are dissolved in 100 parts by volume of hot acetone. The solution thus obtained is mixed with 15 parts by weight of diethyl aminoethyl chloride and heated to boiling for 3 hours. The reaction mixture is evaporated under vacuum to dryness. The residue is treated with 150 parts by volume of boiling acetone under reflux. The crystals formed are filtered off and treated once more with 200 parts by volume of boiling ethylacetate. The crystals formed are recrystallised from isopropanol. The pure product is the 5,5-phenyl-propyl-3-diethyl-aminoethyl barbituric acid hydrochloride. It forms colourless needles with a melting point of 222-223° C. Yield: 70.25%.

*Example 4*

4.88 parts by weight of phenyl allyl barbituric acid are dissolved in 20 parts by volume of acetone. To the solution thus obtained 3 parts by weight of diethyl aminoethyl chloride are added. The reaction mixture is heated to boiling for 2 hours. The crystals separated after cooling and standing for several hours are filtered off and recrystallised twice from isopropanol. The 5,5-phenyl-allyl-3-diethyl-aminoethyl barbituric acid hydrochloride forms colourless needles melting at 230° C. Yield: 67.2%

What I claim is:

1. In a process of producing barbituric acid compounds of the formula

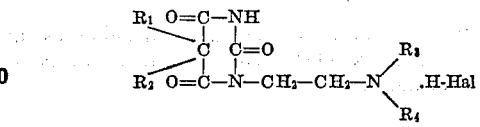

wherein $R_1$ indicates an alkyl radical with 1 to 3 carbon atoms, $R_2$ indicates phenyl, $R_3$ and $R_4$ indicate members selected from the group consisting of alkyl radicals with 1 to 3 carbon atoms, and $R_3$ and $R_4$, together with the nitrogen atoms to which they are attached, forming a heterocylic ring selected from the group consisting of the piperidine, pyrrolidine, and morpholine ring, and Hal indicates a halogen selected from the group consisting of chlorine and bromine, the steps which consist in dissolving, while heating, a barbituric acid of the formula

wherein $R_1$ and $R_2$ represent the same members as indicated above, in a solvent selected from the group consisting of a lower alkanol, an acetic acid ester with a lower alkanol, and an alkanone with 3 to 6 carbon atoms, adding to said solution, while heating, an amino ethyl halide compound of the formula

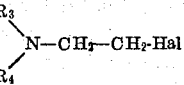

wherein $R_3$, $R_4$, and Hal represent the same members as indicated above, and continuing heating until condensation of the barbituric acid with the amino ethyl halide is completed.

2. In the process of producing barbituric acid compounds of the formula

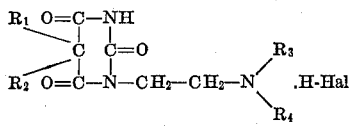

wherein $R_1$ indicates an alkyl radical with 1 to 3 carbon atoms, $R_2$ indicates phenyl, $R_3$ and $R_4$ indicate members selected from the group consisting of alkyl radicals with 1 to 3 carbon atoms, and $R_3$ and $R_4$ together with the nitrogen atom to which they are attached, forming a heterocyclic ring selected from the group consisting of the piperidine, pyrrolidine, and morpholine ring, and Hal indicates a halogen selected from the group consisting of chlorine and bromine, the steps which consist in dissolving, while heating, a barbituric acid of the formula

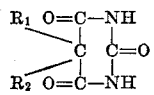

wherein $R_1$ and $R_2$ represent the same members as indicated above, in a solvent selected from the group consisting of a lower alkanol, an acetic acid ester with a lower alkanol, and an alkanone with 3 to 6 carbon atoms, adding to said solution, while heating, the substantially stoichiometrical amount of an amino ethyl halide compound of the formula

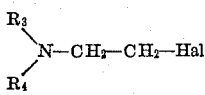

wherein $R_3$, $R_4$, and Hal represent the same members as indicated above, and continuing heating until condensation of the barbituric acid with the amino ethyl halide is completed, whereby the temperature during the reaction is maintained at between about 40° C. and about 90° C.

3. In a process of producing barbituric acid compounds of the formula

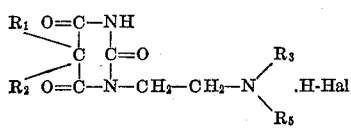

wherein $R_1$ indicates an alkyl radical with 1 to 3 carbon atoms, $R_2$ indicates phenyl, $R_3$ and $R_4$ indicate members selected from the group consisting of alkyl radicals with 1 to 3 carbon atoms, and $R_3$ and $R_4$, together with the nitrogen atom to which they are attached, forming a heterocyclic ring selected from the group consisting of the piperidine, pyrrolidine, and morpholine ring, and Hal indicates a halogen selected from the group consisting of chlorine and bromine, the steps which consist in mixing a suspension of the sodium compound of a barbituric acid of the formula

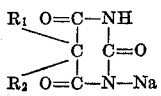

wherein $R_1$ and $R_2$ represent the same members as indicated above, in a solvent selected from the group consisting of a lower alkanol, an acetic acid ester with a lower alkanol, and an alkanone with 3 to 6 carbon atoms with a solution of the substantially stoichiometrical amount of a hydrohalide of an amino ethyl halide compound of the formula

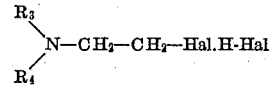

wherein $R_3$, $R_4$, and Hal represent the same members as indicated above, in such a solvent, filtering off the sodium halide formed, and heating the resulting filtrate at a temperature between about 40° C. and about 90°C. until condensation of the barbituric acid with the amino ethyl halide is completed.

4. In a process of producing barbituric acid compounds of the formula

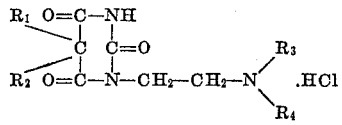

wherein $R_1$ indicates an alkyl radical with 1 to 3 carbon atoms, $R_2$ indicates phenyl, $R_3$ and $R_4$ indicate members selected from the group consisting of alkyl radicals with 1 to 3 carbon atoms, and $R_3$ and $R_4$ together with the nitrogen atom to which they are attached, forming a heterocyclic ring selected from the group consisting of the piperidine, pyrrolidine, and morpholine ring, the steps which consist in dissolving, while heating, a barbituric acid of the formula

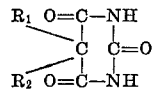

wherein $R_1$ and $R_2$ represent the same members as indicated above, in a solvent selected from the group consisting of a lower alkanol, an acetic acid ester with a lower alkanol, and an alkanone with 3 to 6 carbon atoms, adding to said solution, while heating, an amino ethyl chloride compound of the formula

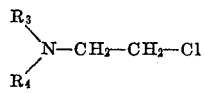

wherein $R_3$ and $R_4$ represent the same members as indicated above, and continuing heating until condensation of the barbituric acid with the amino ethyl halide is completed.

5. In a process of producing barbituric acid compounds of the formula

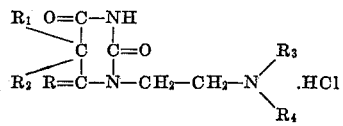

wherein $R_1$ indicates an alkyl radical with 1 to 3 carbon atoms, $R_2$ indicates phenyl, and $R_3$ and $R_4$ indicate members selected from the group consisting of alkyl radicals with 1 to 3 carbon atoms, and $R_3$ and $R_4$, together with the nitrogen atom to which they are attached, forming a heterocyclic ring selected from the group consisting of the piperidine, pyrrolidine, and morpholine ring, the steps which consist in mixing a suspension of the sodium compound of a barbituric acid of the formula

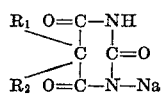

wherein $R_1$ and $R_2$ represent the same members as indicated above, in a solvent selected from the group consisting of a lower alkanol, an acetic acid ester with a lower alkanol, and an alkanone with 3 to 6 carbon atoms with a solution of the substantially stoichiometrical amount of the hydrochloride of an amino ethyl chloride compound of the formula

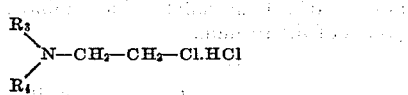

wherein $R_3$ and $R_4$ represent the same members as indicated above, in such a solvent, filtering off the sodium chloride formed, and heating the resulting filtrate at a temperature between about 40° C. and about 90° C. until condensation of the barbituric acid with the amino ethyl chloride is completed.

References Cited in the file of this patent

Arch. Chem. Farm., vol 2, pp. 1-8 (1934) (Polish).
Chiti et al.: Il Farmaco, Ed. Sc., vol IX, Fasc. 11, pp. 617-625.